US010016701B2

(12) United States Patent
Grosso

(10) Patent No.: US 10,016,701 B2
(45) Date of Patent: Jul. 10, 2018

(54) RECOVERY OF HALOGENS BY PARTIAL CONDENSATION

(71) Applicant: Reaction 35, LLC, Houston, TX (US)

(72) Inventor: Philip Grosso, Auburn, CA (US)

(73) Assignee: Reaction 35, LLC, Houston, TX (US)

( * ) Notice: Subject to any disclaimer, the term of this patent is extended or adjusted under 35 U.S.C. 154(b) by 424 days.

(21) Appl. No.: 14/289,177

(22) Filed: May 28, 2014

(65) Prior Publication Data

US 2014/0356269 A1  Dec. 4, 2014

Related U.S. Application Data

(60) Provisional application No. 61/828,826, filed on May 30, 2013.

(51) Int. Cl.
| | | |
|---|---|---|
| *C01B 7/09* | (2006.01) | |
| *B01D 53/86* | (2006.01) | |
| *B01D 19/00* | (2006.01) | |
| *C01B 7/07* | (2006.01) | |
| *C01B 7/13* | (2006.01) | |
| *B01D 53/00* | (2006.01) | |
| *B01D 53/68* | (2006.01) | |

(52) U.S. Cl.
CPC ....... *B01D 19/0036* (2013.01); *B01D 53/002* (2013.01); *B01D 53/68* (2013.01); *C01B 7/0706* (2013.01); *C01B 7/0712* (2013.01); *C01B 7/093* (2013.01); *C01B 7/135* (2013.01); *B01D 2257/2042* (2013.01); *B01D 2257/2045* (2013.01); *B01D 2257/2047* (2013.01)

(58) Field of Classification Search
CPC .............. B01D 19/0036; B01D 53/002; B01D 2257/2042; B01D 2257/2045; C01B 7/0712; C01B 7/0706; C01B 7/093; C01B 7/135
USPC ........................................ 423/500, 502, 507
See application file for complete search history.

(56) References Cited

U.S. PATENT DOCUMENTS

| | | | | |
|---|---|---|---|---|
| 2,536,547 | A * | 1/1951 | Haygood | A47B 81/067 312/327 |
| 3,544,274 | A | 12/1970 | Van Dijk et al. | |
| 5,366,949 | A * | 11/1994 | Schubert | B01J 23/10 423/502 |
| 7,579,510 | B2 | 8/2009 | Gadewar et al. | |
| 2004/0062705 | A1 | 4/2004 | Ludec | |
| 2007/0238909 | A1 * | 10/2007 | Gadewar | C07C 1/26 585/16 |
| 2007/0251382 | A1 | 11/2007 | Gadewar et al. | |
| 2008/0314758 | A1 | 12/2008 | Grosso et al. | |

(Continued)

OTHER PUBLICATIONS

International Search Report and Written Opinion issued in International Application No. PCT/US2014/039796, dated Oct. 8, 2014 (10 pages).

*Primary Examiner* — Ngoc-Yen Nguyen
(74) *Attorney, Agent, or Firm* — Adolph Locklar

(57) ABSTRACT

A method includes injecting a feed stream including a hydrogen halide and water into a vapor liquid separator. The feed stream has a liquid phase and a vapor phase. The method further includes separating the liquid phase and the vapor phase in the vapor liquid separator to form condensate and vapor, and discharging the condensate from the vapor liquid separator in a liquid stream. The method also includes discharging the vapor from the vapor liquid separator in a vapor stream.

23 Claims, 7 Drawing Sheets

(56) References Cited

U.S. PATENT DOCUMENTS

| | | | |
|---|---|---|---|
| 2010/0015034 A1* | 1/2010 | Hall | C01B 7/096 423/502 |
| 2011/0015458 A1* | 1/2011 | Waycuilis | C01B 7/096 585/310 |
| 2012/0302808 A1 | 11/2012 | Julka et al. | |
| 2013/0078157 A1 | 3/2013 | Stoimenov et al. | |

* cited by examiner

RECOVERY OF HALOGENS BY PARTIAL CONDENSATION

CROSS-REFERENCE TO RELATED APPLICATIONS

This application claims the benefit of and priority to U.S. Provisional Application No. 61/828,826, filed May 30, 2013 entitled "HBr Recovery by Partial Condensation," the entire disclosure of which is hereby incorporated by reference.

FIELD

The present disclosure generally relates to the recovery of halogens from streams that include water.

BACKGROUND

Halogenated compounds are used in a variety of industrial processes. In certain of these processes, hydrogen halides are formed. In some instances, dilute hydrogen halide may be concentrated in a distillation system and recovered to avoid discharging the dilute hydrogen halide from the industrial process.

BRIEF DESCRIPTION OF THE DRAWINGS

The present disclosure is best understood from the detailed description when read with the accompanying figures. In accordance with the standard practice in the industry, various features are not drawn to scale.

SUMMARY

Figure 5:
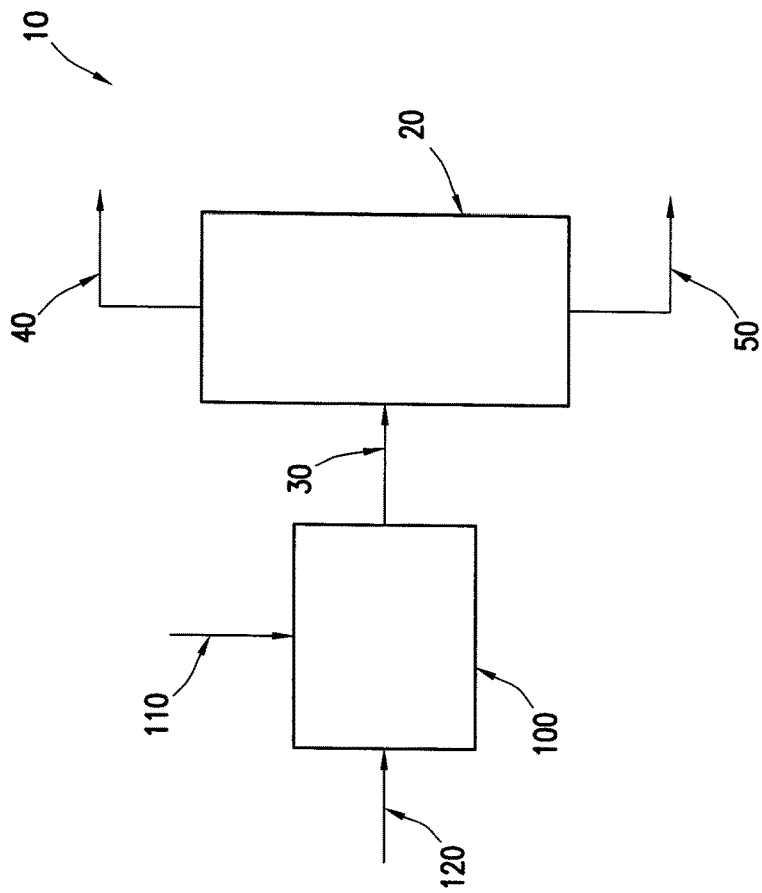
FIG. 5 is a process flow diagram consistent with at least one embodiment of the present disclosure.

In an embodiment, a method is disclosed. The method includes injecting a feed stream including a hydrogen halide and water into a vapor liquid separator. The feed stream has a liquid phase and a vapor phase. The method further includes separating the liquid phase and the vapor phase in the vapor liquid separator to form condensate and vapor, and discharging the condensate from the vapor liquid separator in a liquid stream. The method also includes discharging the vapor from the vapor liquid separator in a vapor stream.

In another embodiment, a method is disclosed. The method includes feeding an HBr feed stream to a first HBr oxidation reactor and combining air with the HBr feed stream in the first HBr oxidation reactor to form a first oxidation reactor discharge stream. The method also includes feeding the first oxidation reactor discharge stream to a quench cooling unit and cooling the first reactor discharge stream in the quench cooling unit by injecting water into the first reactor discharge stream to form a second HBr feed stream. In addition, the method includes feeding the second HBr feed stream to a second HBr oxidation reactor and combining air with the second HBr feed stream in the second HBr oxidation reactor to form an elevated temperature heat exchanger feed. The elevated temperature heat exchanger feed includes water, HBr, bromine, oxygen, and nitrogen. The method also includes cooling the elevated temperature heat exchanger feed in a heat exchanger to form an elevated temperature mixer feed and mixing the elevated temperature mixer feed in a mixer with water to form a vapor liquid separator feed stream. The method further includes feeding the vapor liquid separator feed stream to a vapor liquid separator and separating the vapor liquid feed stream in the vapor liquid separator into a vapor liquid separator liquid stream and a vapor liquid separator vapor stream, wherein the vapor liquid separator liquid stream includes HBr. In addition, the method includes feeding the vapor liquid separator vapor stream to a cooling condensation unit and forming a cooling condensation unit discharge stream in the cooling condensation unit. The method also includes feeding the cooling condensation unit discharge stream to a separator to form a recycle water stream, a bromine stream and a light gas stream.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
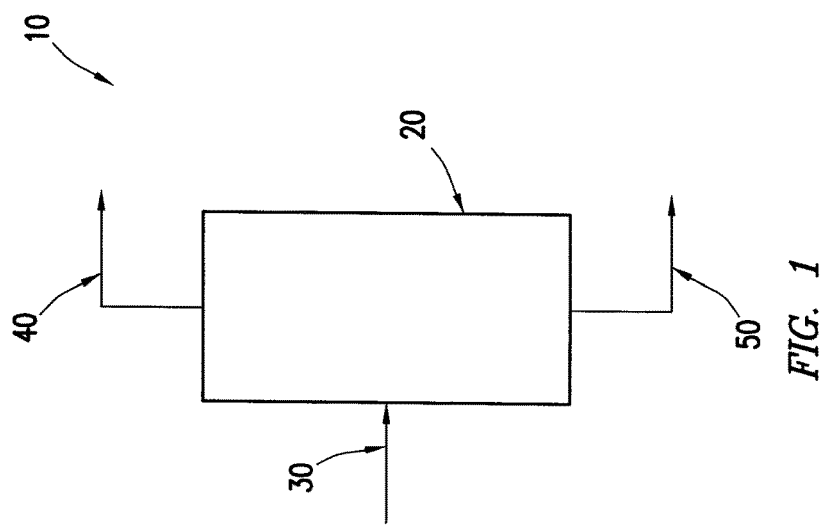
FIG. 1 is a process flow diagram consistent with at least one embodiment of the present disclosure.

FIG. 1 is a process flow diagram depicting partial condensation system 10 consistent with certain embodiments of the present disclosure. Partial condensation system 10 includes vapor liquid separator 20, VLS feed 30, VLS vapor stream 40, and VLS liquid stream 50.

VLS feed 30 may include a hydrogen halide, including hydrogen chloride, hydrogen bromide and hydrogen iodide, and water. In addition to the hydrogen halide and water, VLS feed 30 may include a halogen, oxygen, nitrogen, argon, carbon dioxide, and other gases. VLS vapor stream 40 may include the hydrogen halide, the halogen, water, oxygen, nitrogen, argon, carbon dioxide, and other gases. VLS liquid stream 50 may include the hydrogen halide, water, and the halogen. In certain embodiments, greater than 70%, greater than 80%, or greater than 90% of the halogen present in VLS feed 30 is in VLS vapor stream 40.

In certain embodiments of the present disclosure, the hydrogen halide content of VLS feed 30 may be substantially less than the water content of VLS feed 30. For instance, the water content of VLS feed 30 may be between 500 and 4000 times the hydrogen halide content of VLS feed 30, between 1000 and 3000 times the hydrogen halide content of VLS feed 30, or between 1500 and 2500 times the hydrogen halide content of VLS feed 30 (all by weight).

VLS feed 30 may be a combination of liquid and vapor. As VLS feed 30 enters vapor liquid separator 20, the vapor portion of VLS feed 30 separates from the liquid in VLS feed 30. The liquid, termed "condensate" in this disclosure, settles to the bottom of vapor liquid separator 20 and exits via VLS liquid stream 50. Vapor in vapor liquid separator 20 exits via VLS vapor stream 40. In some embodiments, a portion of the liquid in VLS feed 30 may flash and become vapor.

Vapor liquid separator 20 may be a flash drum, flash pot, knock-out drum, knock-out pot, piping, distillation column, absorption column or any other vessel or equipment designed to allow a portion of a liquid in the VLS feed 30 to vaporize and exit vapor liquid separator 20 via VLS vapor stream 40. Vapor liquid separator 20 may include a de-entrainment mesh pad (not shown) to assist in separation of liquid droplets entrained in the vapor or an inlet diffuser (not shown) to assist in distributing VLS feed 30 in vapor liquid separator 20.

One of ordinary skill in the art will recognize that the temperature, pressure and vapor/liquid distribution of VLS feed 30 may be set depending on such non-limiting factors as the type of halogen, the desired concentration of the hydrogen halide in VLS vapor stream 40, and desired materials of construction of vapor liquid separator 20. In certain non-limiting embodiments, the pressure in vapor liquid separator 20 may be from 1 to 20 bar, or from 1 to 15 bar, or about 12 bar.

Figure 2:
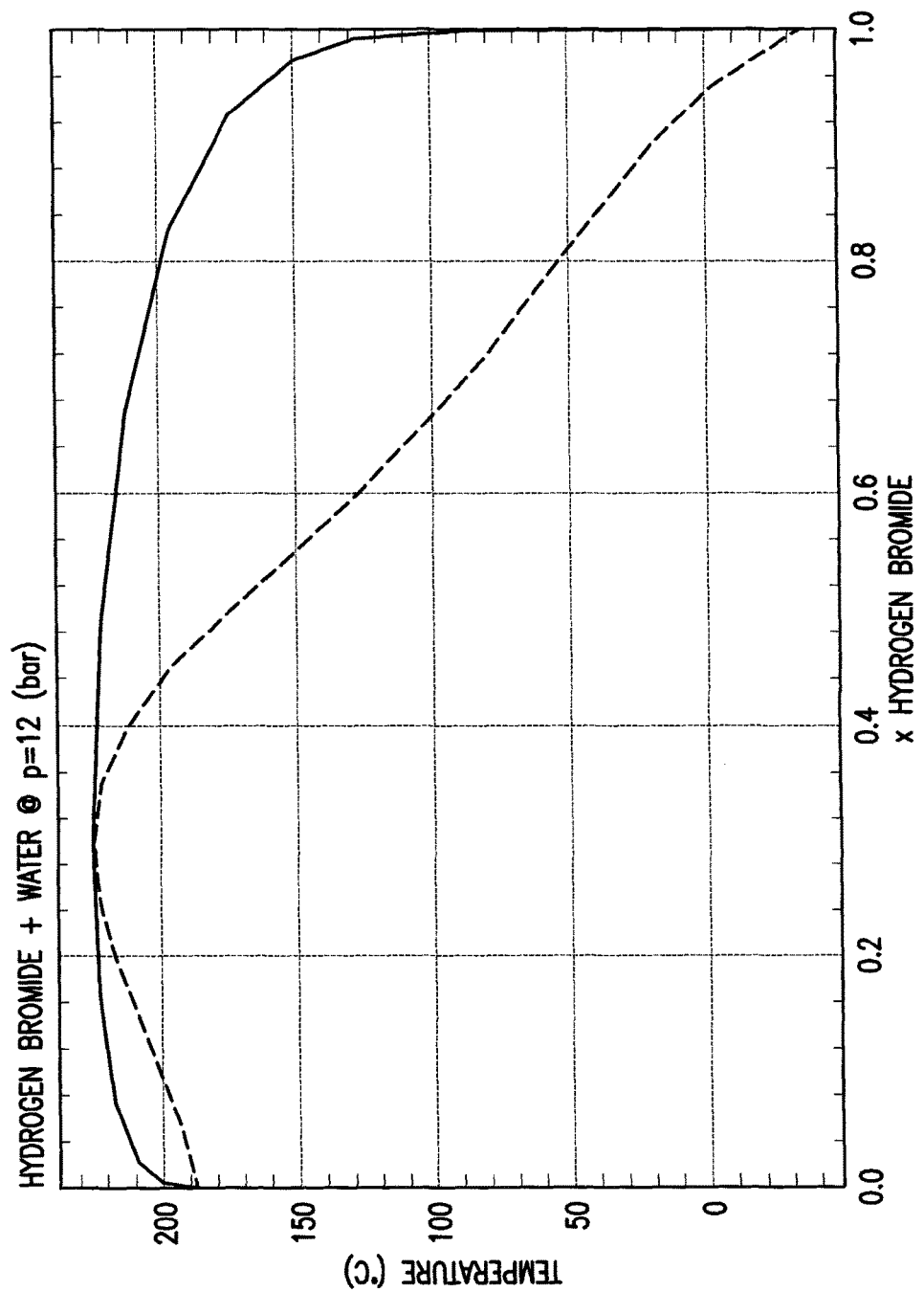
FIG. 2 is a VLE diagram of hydrogen bromide at 12 bar.
Figure 3:
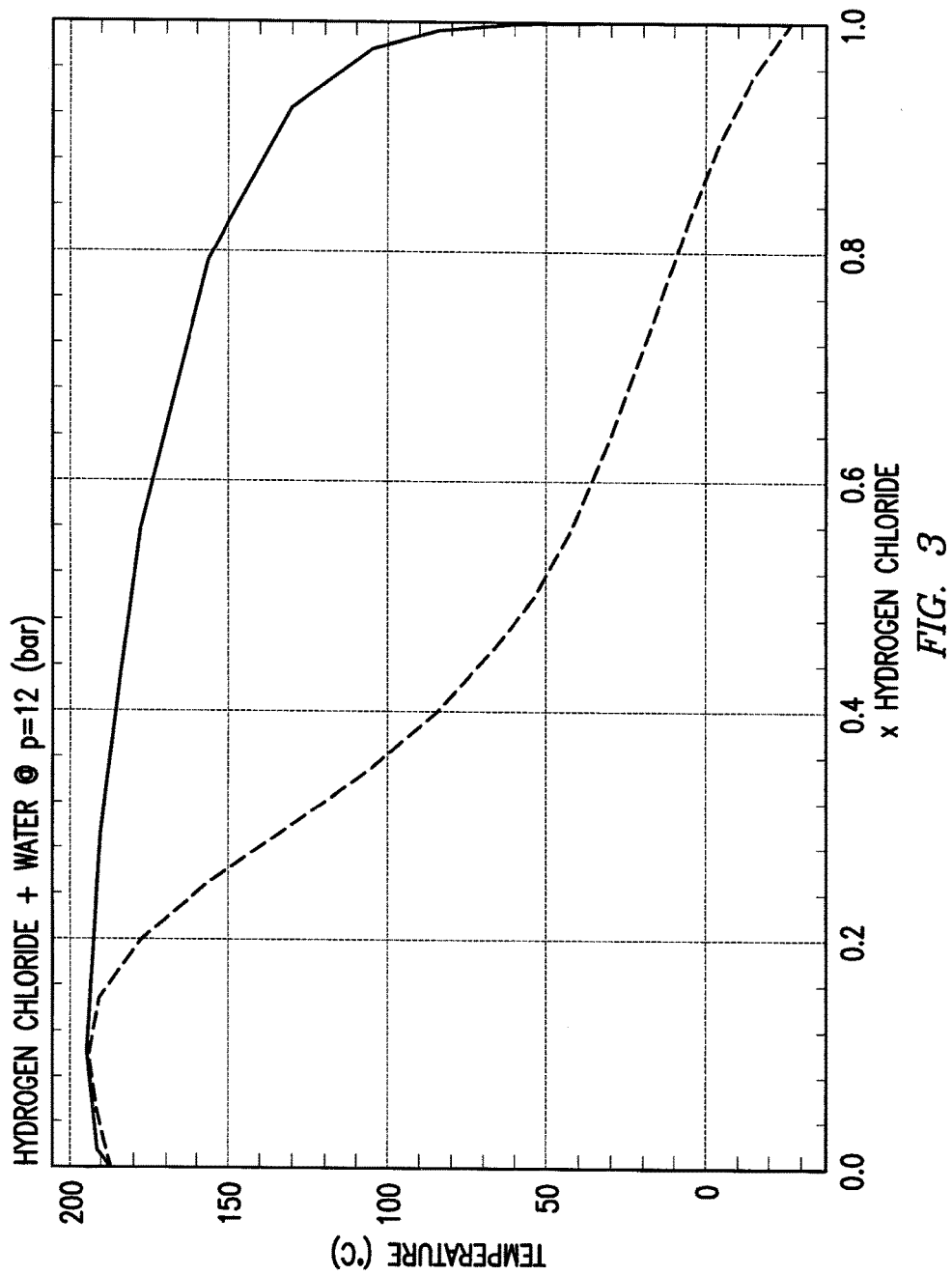
FIG. 3 is a VLE diagram of hydrogen chloride at 12 bar.
Figure 4:
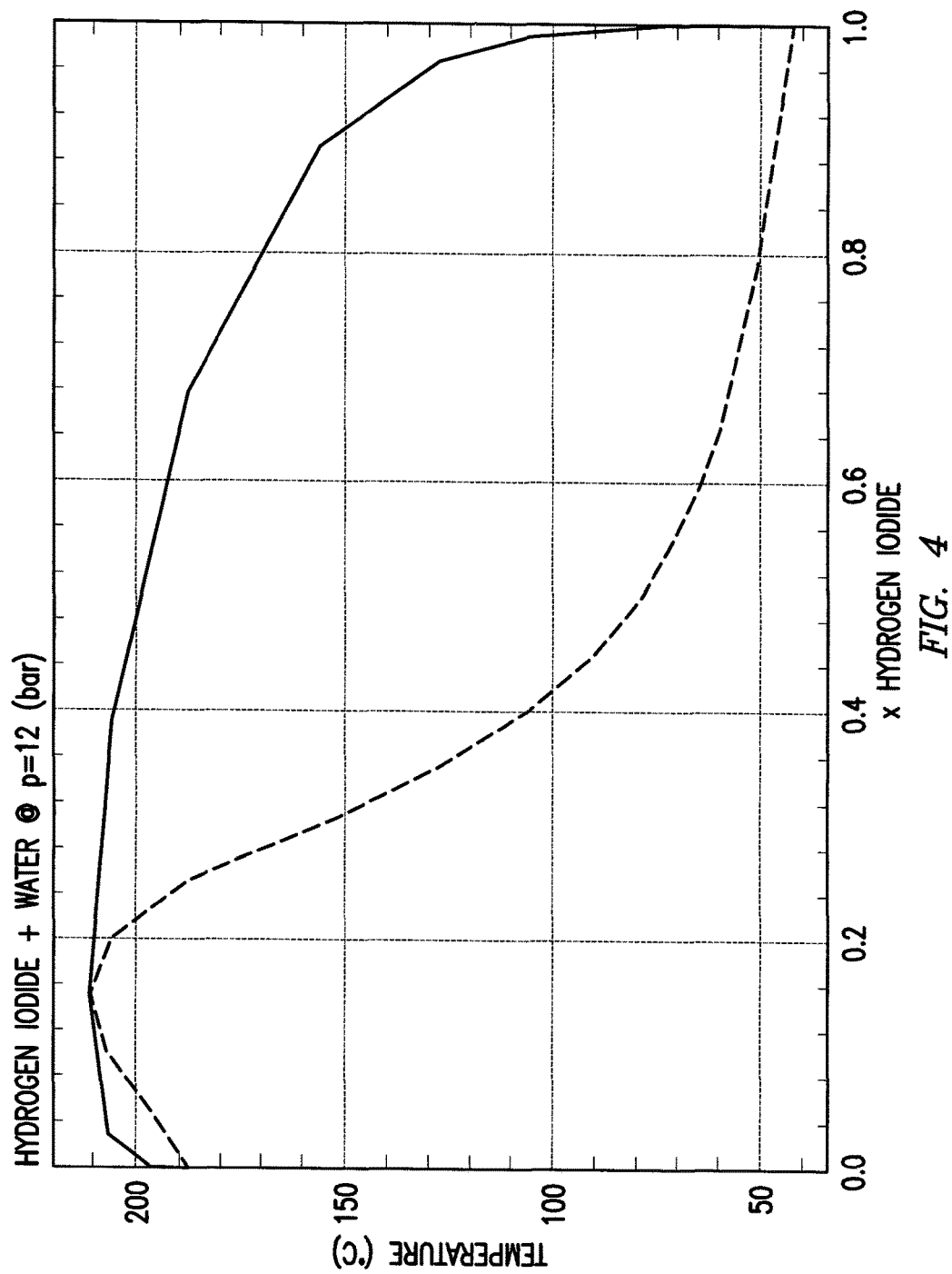
FIG. 4 is a VLE diagram of hydrogen iodide at 12 bar.

By selecting the temperature of VLS feed 30 and thereby vapor liquid separator 20, the concentration of the hydrogen halide in VLS vapor stream 40 and in VLS liquid stream 50 may be adjusted to a desired value. In accordance with FIGS. 2, 3, and 4, which are the vapor liquid equilibrium diagrams for hydrogen bromide, hydrogen chloride, and hydrogen iodide, respectively, by selecting the temperature of vapor liquid separator 20, the hydrogen halide in VLS feed 30 may be concentrated in the condensate in VLS feed 30, which exits vapor liquid separator 20 in VLS liquid stream 50. In certain embodiments, more than 90% or more than 95% or more than 99% of the hydrogen halide present in VLS feed 30 exits vapor liquid separator 20 in VLS liquid stream 50. In other embodiments, between 99.7% and 99.9% of the hydrogen halide present in VLS feed 30 exits vapor liquid separator 20 in VLS liquid stream 50.

In certain embodiments of the present disclosure, the amount of water in VLS feed 30 that exits vapor liquid separator 20 in VLS liquid stream 50 is less than 20%, less than 10% or less than 8% of the water in VLS feed 30. In other embodiments, the amount of water in VLS feed 30 that exits vapor liquid separator 20 in VLS liquid stream 50 is between 6 and 8%. The concentration of water in VLS liquid stream 50 may be greater than 80%, greater than 90% or between 90 and 100% (by weight).

In certain embodiments of the present disclosure, the VLS liquid stream 50 is used in a hydrogen halide oxidation process.

In some embodiments of the present disclosure, it may be desirable to cool a water/hydrogen halide mixture prior to entry to vapor liquid separator 20. For instance, as shown in FIG. 5, mixer 100 may be located upstream of vapor liquid separator 20. Elevated temperature mixer feed 120 may be mixed with liquid cooling feed 110 in mixer 100 to cool the water/hydrogen halide mixture. In some such embodiments, liquid cooling feed 110 includes water. In certain embodiments, liquid cooling feed 110 may include a hydrogen halide. Liquid cooling feed 110 may be less than 100° C., less than 80° C. or less than 50° C.

Figure 6:
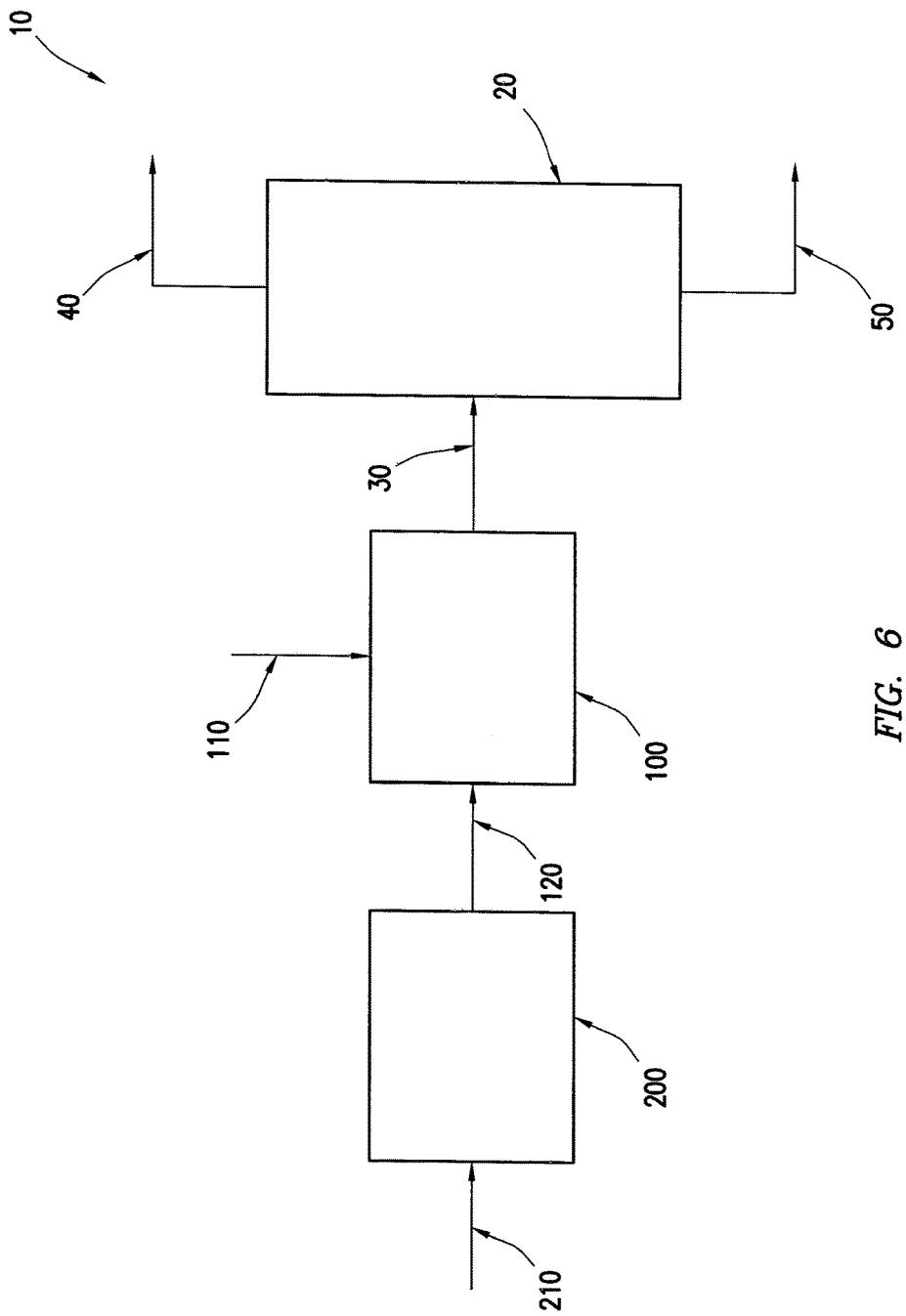
FIG. 6 is a process flow diagram consistent with at least one embodiment of the present disclosure.

In other embodiments of the present disclosure, excess heat of the water/hydrogen halide mixture may be recovered through the use of a heat exchanger, such as a steam boiler. As shown in FIG. 6, elevated temperature heat exchanger feed 210 is sent to heat exchanger 200, wherein the excess heat of elevated temperature heat exchanger feed 210 may be used to heat a cooling fluid, such as water. In certain such embodiments, steam formed by elevated temperature heat exchanger feed 210 may be used elsewhere in the industrial process that forms elevated temperature heat exchanger feed 210. Heat exchanger 200 may be operated in conjunction with mixer 100 to control the amount of condensate formed in vapor liquid separator 20.

Figure 7:
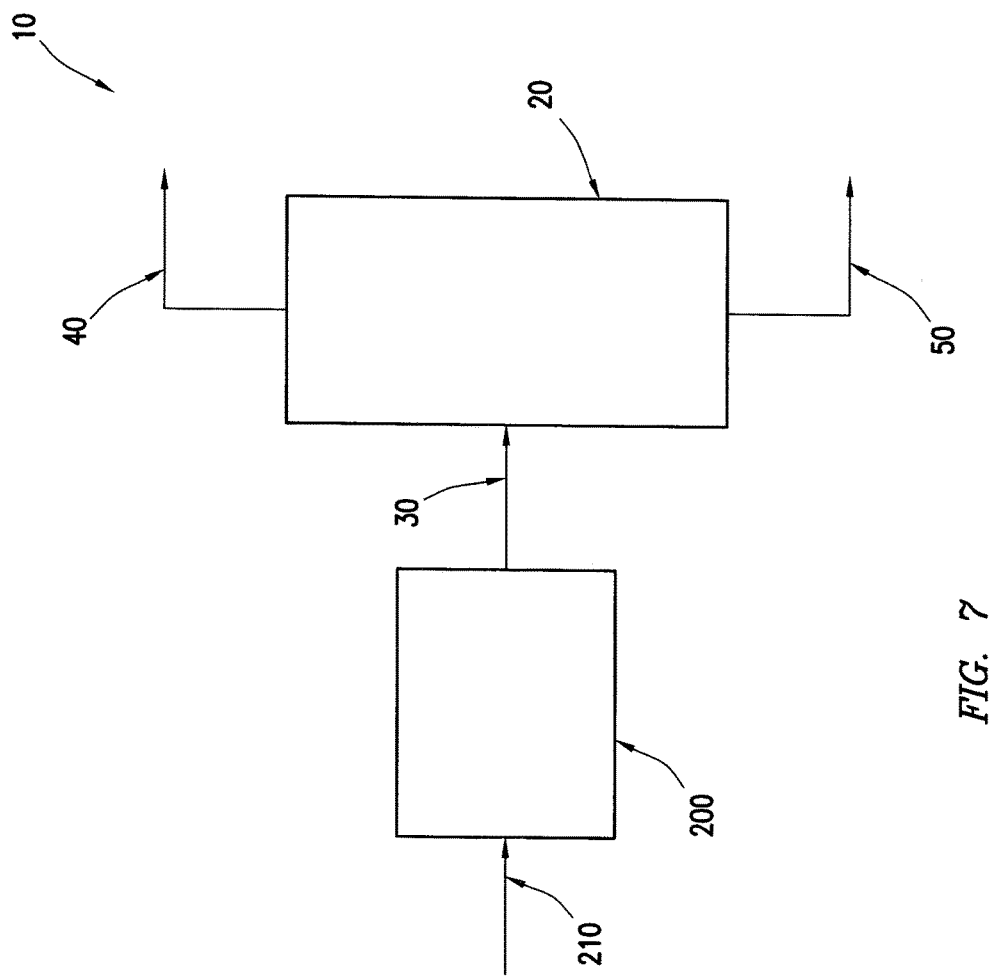
FIG. 7 is a process flow diagram consistent with at least one embodiment of the present disclosure.

FIG. 7 depicts yet another embodiment of partial condensation system 10, wherein mixer 100 is not used. In the embodiment shown in FIG. 7, heat exchanger 200 may be operated to control the amount of condensate in vapor liquid separator 20.

In certain embodiments of the present disclosure, the elevated temperature heat exchanger feed 210 is generated in an oxidation reactor. In certain other embodiments of the present disclosure, the elevated temperature mixer feed 120 is generated in an oxidation reactor. In still other embodiments of the present disclosure, VLS feed 30 is generated in an oxidation reactor.

Figure 8:
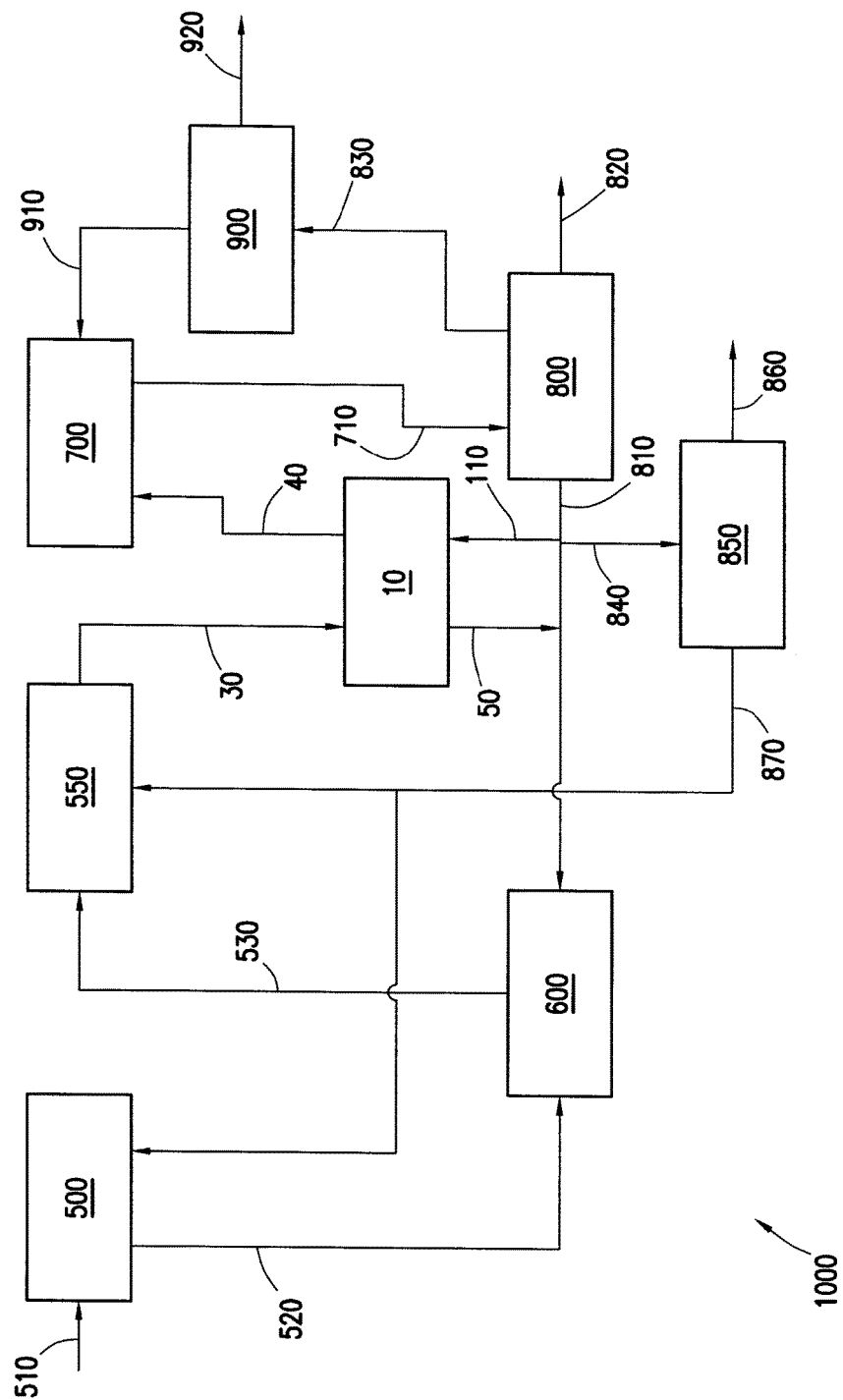
FIG. 8 is a process flow diagram consistent with at least one embodiment of the present disclosure.

FIG. 8 depicts an embodiment of the present disclosure wherein partial condensation system 10 is a part of hydrogen bromide oxidation process 1000. In the non-limiting embodiment depicted in FIG. 8, HBr feed stream 510 is sent to first HBr oxidation reactor 500 where it is combined with air 870. The resulting first HBr oxidation discharge stream 520 may contain HBr, water, oxygen, nitrogen, $CO_2$ and other gases that may be found in air. First HBr oxidation discharge stream 520 is cooled in quench cooling unit 600 by direct injection of water from VLS liquid stream 50. Second HBr feed stream 530 exits quench cooling unit 600 and is fed to second HBr oxidation reactor 550, where it is combined with air 870. VLS feed 30 is discharged from second HBr oxidation reactor 550 and fed to partial condensation system 10. In alternative embodiments (not shown), elevated temperature mixer feed 120 or elevated temperature heat exchanger feed 210 may be discharged from second HBr oxidation reactor 550 in place of VLS feed 30. As described above, VLS liquid stream 50 is discharged from vapor liquid separator 20 of partial condensation system 10 and is recycled to quench cooling unit 600, where it is directly injected into first HBr oxidation discharge stream 520. VLS vapor stream 40 is fed to cooling condensation unit 700, which cools and condenses condensable compounds in VLS vapor stream 40. Cooling condensation unit discharge stream 710 exits cooling condensation unit 700 and is separated into recycle water stream 810, bromine stream 820 and light gas stream 830 in separator 800. Light gas stream 830 is sent to scavenging unit 900. In scavenging unit 900, remaining bromine compounds are recycled through scavenging unit recycle 910 to cooling condensation unit 700. Remaining light gases are vented from hydrogen bromide oxidation process 1000 through vent gas discharge 920.

Hydrogen bromide oxidation process 1000 generates more water than is used by hydrogen bromide oxidation process 1000. Therefore, a portion of recycle water stream 810 is discharged through stripper feed line 840 to stripper 850. In stripper 850, bromine is stripped from recycle water stream 810. Water from which bromine is stripped is discharged from stripper 850 through waste water stream 860.

A portion of recycle water stream 810 may be sent to partial condensation system 10 through liquid cooling feed 110. In an alternative embodiment, where partial condensation system 10 does not contain mixer 100 (not shown), liquid cooling feed 110 is omitted.

Embodiments of the present disclosure may be used in hydrogen halide oxidation processes including those using HBr, HCl, and HI. For instance, embodiments may be used in the oxidation of hydrogen bromine as part of a process of converting natural gas to liquid hydrocarbons as shown and described, for instance, in U.S. Pat. No. 7,579,510. U.S. Pat. No. 7,579,510 is hereby incorporated fully by reference. Embodiments of the present disclosure may be used in the oxidation of hydrogen bromine as part of a process of converting propane to propylene as shown and described in, for instance, U.S. Patent Publication No. 2012-0302808. U.S. Patent Publication No. 2012-0302808 is hereby incorporated fully by reference.

Embodiments of the present disclosure may also be used in the oxidation of hydrogen chloride, such as in the process of manufacturing vinyl chloride monomer, chlorofluorocarbons, and isocyanates. Embodiments of the present disclosure may further be used in the oxidation of hydrogen iodide, such as in the process of manufacturing p-di-iodo benzene and other iodinated aromatic compounds.

The above example demonstrates possible embodiments of the present disclosure. While the foregoing is directed to embodiments, versions and examples, which are included to enable a person of ordinary skill in the art to make and use the embodiments when the information in this patent is combined with available information and technology, the disclosure is not limited to only these particular embodiments, versions and examples. Other and further embodiments, versions and examples may be devised without departing from the basic scope thereof and the scope thereof is determined by the claims that follow.

What is claimed is:

1. A method comprising:
   injecting a feed stream comprising a hydrogen halide, a halogen, and water into a vapor liquid separator, wherein the feed stream has a liquid phase and a vapor phase, wherein the liquid phase and the vapor phase are separate phases;
   separating the liquid phase and the vapor phase in the vapor liquid separator to form condensate and vapor;
   discharging the condensate from the vapor liquid separator in a liquid stream, wherein the liquid phase comprises the hydrogen halide, water, and the halogen; and
   discharging the vapor from the vapor liquid separator in a vapor stream, wherein the vapor stream comprises at least 70% of the halogen present in the feed stream.

2. The method of claim 1, wherein the feed stream has between 500 and 4000 times as much water as hydrogen halide by weight.

3. The method of claim 1, wherein more than 98% of the hydrogen halide in the feed stream is discharged in the liquid stream.

4. The method of claim 1, wherein less than 15% of the water in the feed stream is discharged in the liquid stream.

5. The method of claim 1, further comprising before the step of injecting the feed stream:
   mixing a cooling fluid and an elevated temperature mixer feed in a mixer; and
   discharging the feed stream from the mixer.

6. The method of claim 5, wherein the cooling fluid comprises water.

7. The method of claim 6, wherein the cooling fluid further comprises a hydrogen halide.

8. The method of claim 5, further comprising before the step of mixing the cooling fluid and the elevated temperature mixer feed in the mixer:
   feeding an elevated temperature heat exchanger feed to a heat exchanger; and
   cooling the elevated temperature heat exchanger feed with a heat exchanger cooling fluid.

9. The method of claim 8, wherein the heat exchanger cooling fluid is water.

10. The method of claim 1, wherein the vapor liquid separator is a flash pot, flash drum, knock-out drum, knock-out pot, distillation column, absorption column, or piping.

11. The method of claim 1, further comprising generating the feed stream in an oxidation reactor.

12. The method of claim 1, further comprising after the step of discharging the vapor from the vapor liquid separator in the vapor stream:
   feeding the liquid stream to a hydrogen halide oxidation process.

13. A method comprising:
   feeding an HBr feed stream to a first HBr oxidation reactor;
   combining air with the HBr feed stream in the first HBr oxidation reactor to form a first oxidation reactor discharge stream;
   feeding the first oxidation reactor discharge stream to a quench cooling unit;
   cooling the first oxidation reactor discharge stream in the quench cooling unit by injecting water into the first oxidation reactor discharge stream to form a second HBr feed stream;
   feeding the second HBr feed stream to a second HBr oxidation reactor;
   combining air with the second HBr feed stream in the second HBr oxidation reactor to form an elevated temperature heat exchanger feed, wherein the elevated temperature heat exchanger feed comprises water, HBr, bromine, oxygen, and nitrogen;
   cooling the elevated temperature heat exchanger feed in a heat exchanger to form an elevated temperature mixer feed;
   mixing the elevated temperature mixer feed in a mixer with water to form a vapor liquid separator feed stream, wherein the vapor liquid separator feed stream has a separate liquid phase and vapor phase;
   feeding the vapor liquid separator feed stream to a vapor liquid separator;
   separating the vapor liquid feed stream in the vapor liquid separator into a vapor liquid separator liquid stream and a vapor liquid separator vapor stream, wherein the vapor liquid separator liquid stream comprises HBr;
   feeding the vapor liquid separator vapor stream to a cooling condensation unit;
   forming a cooling condensation unit discharge stream in the cooling condensation unit; and
   feeding the cooling condensation unit discharge stream to a separator to form a recycle water stream, a bromine stream and a light gas stream.

14. The method of claim 13, further comprising after the step of feeding the cooling condensation unit discharge stream to the separator to form the recycle water stream, the bromine stream and the light gas stream:
   feeding the light gas stream to a scavenging unit to form a vent gas discharge and a scavenging unit recycle; and
   feeding the scavenging unit recycle to the cooling condensation unit.

15. The method of claim 13, further comprising after the step of separating the vapor liquid feed stream in the vapor liquid separator into the vapor liquid separator liquid stream and the vapor liquid separator vapor stream:
   injecting the vapor liquid separator liquid stream into the quench cooling unit.

16. The method of claim 13, further comprising after the step of feeding the cooling condensation unit discharge stream to the separator to form the recycle water stream, the bromine stream and the light gas stream;
    forming a first portion of the recycle water stream and a second portion of the recycle water stream;
    combining the first portion of the recycle water stream with the vapor liquid separator liquid stream;
    feeding the second portion of the recycle water stream to a stripper;
    stripping bromine from the recycle water stream with an air stream; and
    feeding the air stream to the first HBr oxidation reactor, the second HBr oxidation reactor, or both the first HBr oxidation reactor and the second HBr oxidation reactor.

17. The method of claim 13, wherein more than 99.5% of the HBr in the vapor liquid separator feed stream is discharged from the vapor liquid separator in the vapor liquid separator liquid stream.

18. The method of claim 17, wherein less than 8% of the water in the vapor liquid separator feed stream is discharged in the vapor liquid separator liquid stream.

19. The method of claim 18, wherein the concentration of water in the vapor liquid separator liquid stream is greater than 90%.

20. The method of claim 19, wherein the water mixed with the elevated temperature mixer feed is less than 50° C.

21. The method of claim 1 further comprising flashing in the vapor liquid separator a portion of the liquid in the liquid feed stream.

22. The method of claim 1, wherein between 6% and 8% the of the water in the feed stream exists vapor liquid separate in the liquid stream.

23. The method of claim 1, wherein the concentration of water in the liquid stream is greater than 80% by weight.

\* \* \* \* \*